United States Patent [19]

Andrews et al.

[11] Patent Number: 4,622,552

[45] Date of Patent: Nov. 11, 1986

[54] FACTORED MATCHED FILTER/FFT RADAR DOPPLER PROCESSOR

[75] Inventors: Grealie A. Andrews, Lanham, Md.; Samuel L. Sheller, Fairfax, Va.

[73] Assignee: The United States of America as represented by the Secretary of the Navy, Washington, D.C.

[21] Appl. No.: 575,608

[22] Filed: Jan. 31, 1984

[51] Int. Cl.$^4$ .............................................. G01S 13/02
[52] U.S. Cl. .................................................. 342/196
[58] Field of Search ......... 343/5 FT, 17.2 PC, 17.1 R

[56] References Cited

U.S. PATENT DOCUMENTS

| | | |
|---|---|---|
| 3,249,940 | 5/1966 | Erickson . |
| 3,610,901 | 10/1971 | Lynch . |
| 3,945,010 | 5/1976 | Wardrop . |
| 3,987,285 | 10/1976 | Perry . |
| 4,028,700 | 6/1977 | Carey et al. . |
| 4,053,885 | 10/1977 | Tomita et al. . |
| 4,075,630 | 2/1978 | Shapiro et al. . |
| 4,156,876 | 5/1979 | Debuisser . |
| 4,212,084 | 7/1980 | Poole . |
| 4,237,461 | 12/1980 | Cantrell et al. ................. 343/5 FT |
| 4,297,702 | 10/1981 | Carnes . |
| 4,313,177 | 1/1982 | Lewis et al. . |
| 4,377,811 | 3/1983 | Mooney, Jr. et al. . |
| 4,379,295 | 4/1983 | Lewis et al. . |
| 4,384,291 | 5/1983 | Lewis et al. . |

Primary Examiner—Thomas H. Tarcza
Assistant Examiner—Donald E. Hayes, Jr.
Attorney, Agent, or Firm—Robert F. Beers; Sol Sheinbein; Ansel M. Schwartz

[57] ABSTRACT

A factored matched filter/FFT radar Doppler processor for reducing the level of clutter components contained in radar signals. The processor includes a matched Doppler filter, having a filter response matched to the spectrum of the clutter components, through which the radar signal is passed. The filtered output of the matched filter is further filtered by a coherent integration filter to further reduce the level of the clutter components.

4 Claims, 17 Drawing Figures

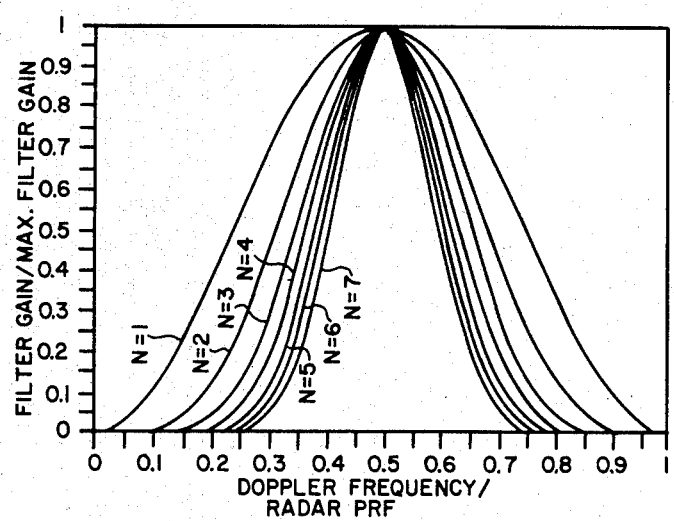
FIG. 1
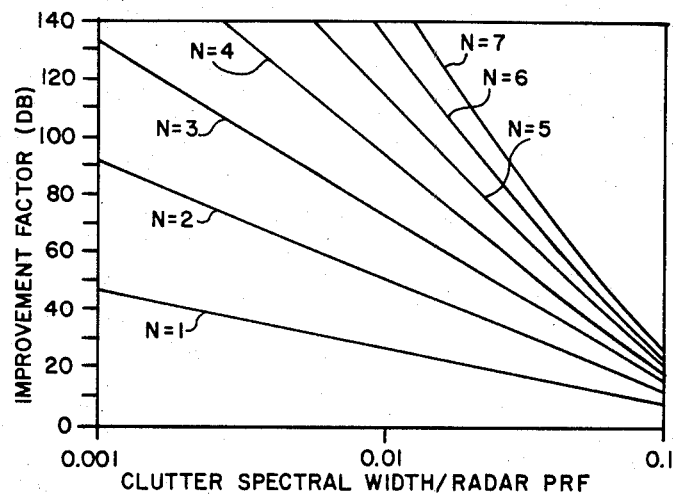
FIG. 2
FIG. 3
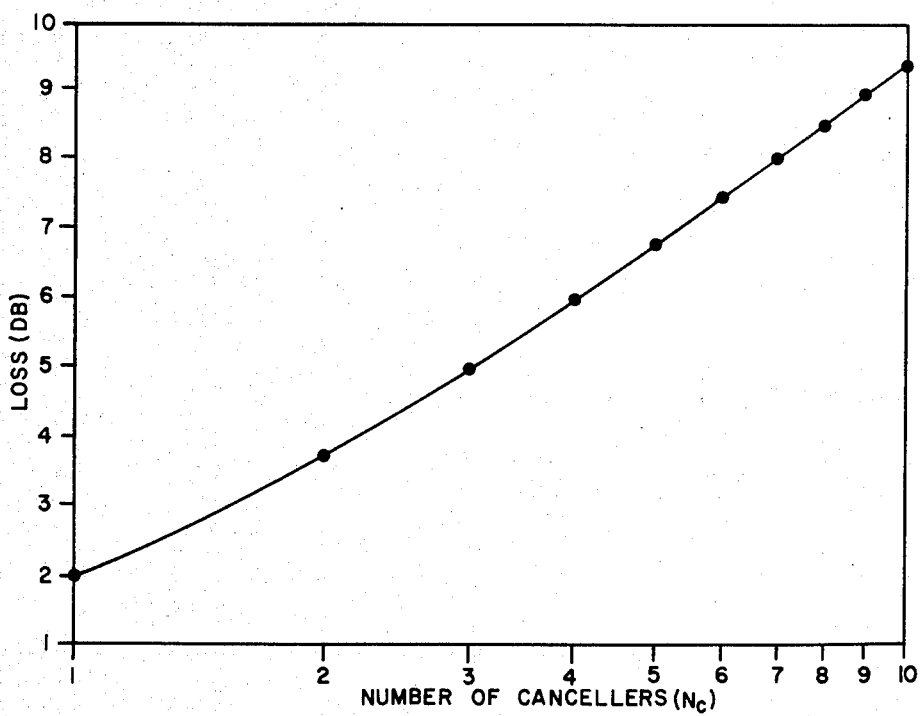

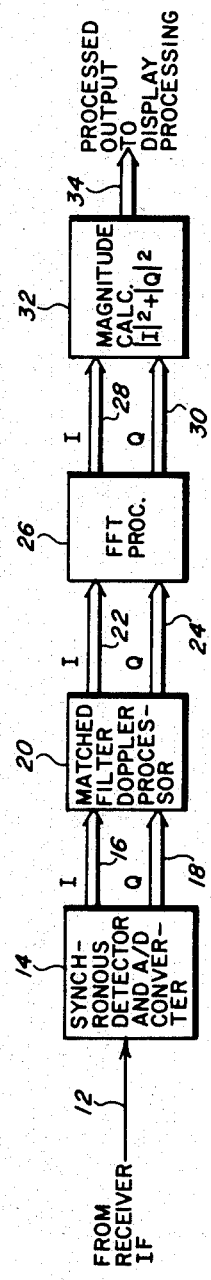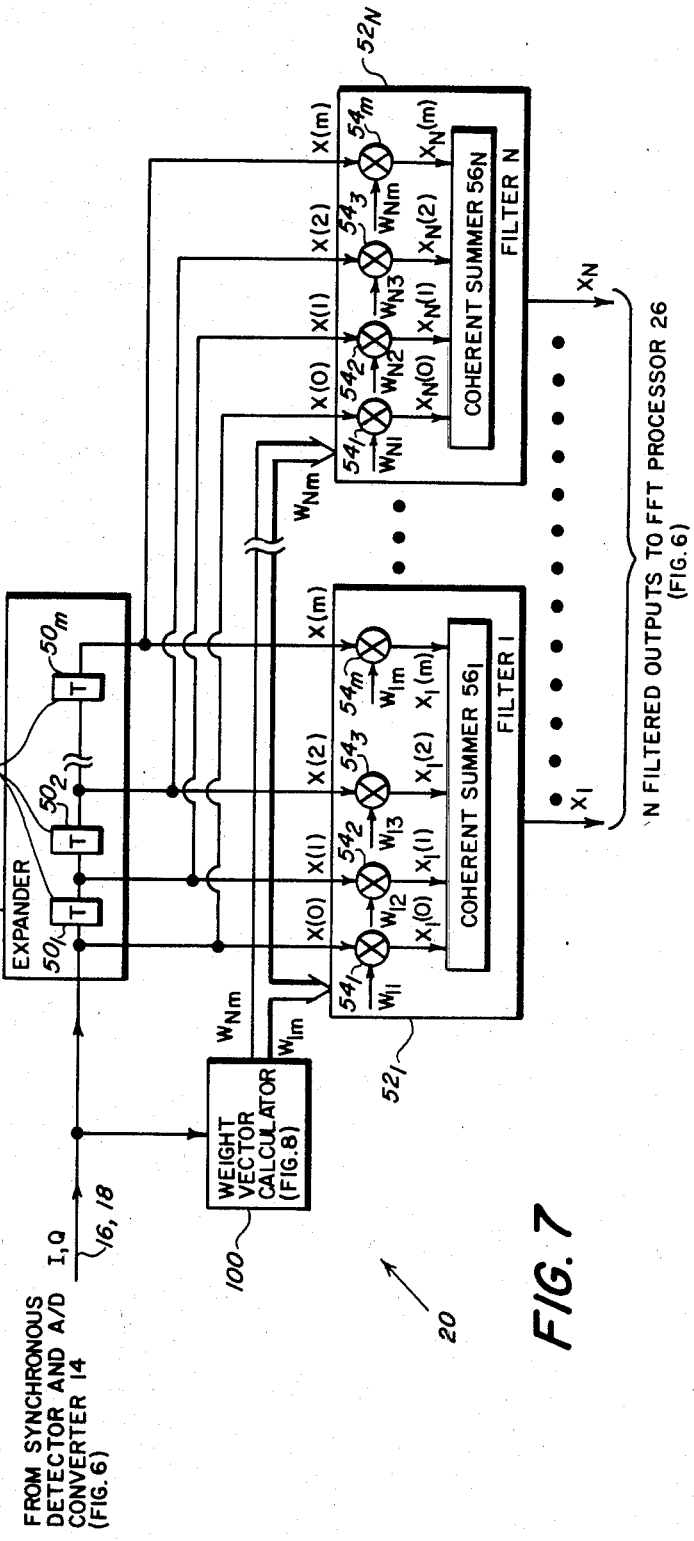
FIG. 6
FIG. 7

FACTORED MATCHED FILTER/FFT RADAR DOPPLER PROCESSOR

BACKGROUND OF THE INVENTION

The present Invention relates generally to novel radar processors and, more particularly, to radar Doppler processors which exhibit maximum clutter rejection and low minimum detectable velocity with minimal loss.

Presently available radar Doppler processing techniques to distinguish moving from fixed targets include moving target indicator processors (MTI), weighted fast Fourier transform processors (FFT), and cascaded MTI and FFT processors. The criteria used to evaluate the performance of a particular Doppler processor are the improvement factor (IF) which is a measure of the clutter rejection capability, the signal processing loss which is a measure of the loss in signal to noise ratio from the ideal, and the minimum detectable velocity (MDV) which is a measure of the ability to detect low velocity targets or targets whose velocity vector is nearly tangential to the direction of the radar. The limitations and disadvantages of the above-mentioned processors are primarily in the areas of the signal processing loss and MDV response.

The conventional MTI canceller delays the returns of a given transmitted pulse and subtracts them from the returns of the next transmitted pulse. N cascaded cancellers are equivalent to an (N+1) sample transversal filter with weights corresponding to the Nth-degree binomial coefficients with alternating signs.

In general, the binomial weights for such a filter are:

$$w_i = (-1)^i \binom{N_c}{i}, \quad i = 0, 1, \ldots, N_c \tag{1}$$

$$\text{where: } \binom{N_c}{i} = \frac{N_c!}{i!(N_c - i)!}$$

and $N_c$ is the number of cancellers.

For a triple canceller (N=3), the binomial weights would be (1, −3, 3, −1) which, when normalized by dividing by the absolute value of the largest binominal coefficient, would be (0.333, −1.0, 1.0, −0.333).

FIG. 1 shows the filter gain normalized to the maximum filter gain versus Doppler frequency normalized to the radar pulse repetition frequency (PRF) for 1 to 7 MTI cancellers (N=1 to N=7). By cascading MTI cancellers the clutter-rejection null (centered around 0 and 1 on the horizontal axis) is broadened as shown by FIG. 1. For a given clutter spectral distribution, the broader null yields a better improvement factor as shown by FIG. 2 which is a plot of the improvement factor (IF) as a function of the clutter spectral width normalized to the radar pulse repetition frequency. The penalty paid for the gain in the improvement factor is a poor MDV response as well as wide blind velocity regions which occur when the Doppler frequency is a multiple of the PRF.

Another concurrent problem with the poorer MDV response is the increase of the loss as the number of cancellers cascaded increases as given by:

$$\text{Loss} = 10 \log (N_c + 1). \tag{2}$$

FIG. 3 is a plot of the loss given by Equation (2) as a function of the number of cancellers ($N_c$). The loss corresponds to the loss of an MTI. However, if the MTI is followed by coherent or noncoherent integrators, this loss can be reduced, but not eliminated.

One method of improving the poor MDV response of the MTI is by shaping the "skirt" of the filter by various weighting schemes. For example, FIG. 4 illustrates the amplitude response for three weighted MTI's: the classical three-pulse canceller (curve 1), the five-pulse delay-line canceller with "optimum" weights (curve 2), and a 15-pulse Chebyshev design (curve 3). In FIG. 4, the factor 1/T is equal to the PRF. This method improves the MDV response, but the shaping requires longer processing times (which implies more pulses processed) which in turn increases the loss.

The weighted FFT gives a better MDV response than the MTI, but it also produces 2-3 dB losses because of the weighting function which lowers the filters' sidelobes everywhere, not just in the vicinity of the clutter. For example, FIGS. 5(a), 5(b), and 5(c) illustrate the amplitude responses as a function of normalized Doppler shift for filters number 33, 25, and 5 of a 64-pulse FFT Doppler processor with-70 dB Chebyshev weights. For each filter the overall loss is −2.2 dB.

Heavy weighting (to control the level of the sidelobes) is needed for the required improvement factor. The result is a wider main lobe with its concurrent poorer MDV response because the filters closer to the main lobe clutter reject less clutter causing the output clutter residue to be dominated by the main lobe clutter. The effect of this domination is a reduced detectability for the low velocity targets in the filters close to the main lobe clutter.

The cascaded MTI/FFT processor reduces the main lobe clutter by cancelling the main lobe clutter with the MTI prior to FFT filters as described above. This results in less signal processing losses since the FFT may need to be weighted less or not weighted at all. However, the MDV response is poorer because of the response of the MTI. Increasing the number of MTI cancellers improves the improvement factor, but at the expense of further deterioration of the MDV response. Also, the improvement is not linear. The more MTI's cascaded, the less improvement gained as shown in FIG. 1 and described above. Again, as described above, weighting the MTI can be used to improve the MDV, but the loss associated with the increased number of pulses that must be processed diminishes the gains that were the original reason for cascading.

SUMMARY OF THE INVENTION

Accordingly, one object of the present Invention is to provide a novel radar Doppler processor which exhibits maximum clutter rejection.

Another object is to provide a novel radar Doppler processor which exhibits a low minimum detectable velocity.

Still another object is to provide a novel radar Doppler processor which exhibits minimum loss.

These and other objects and advantages are provided by a novel radar Doppler processor according to the present Invention for processing radar signals containing clutter components therein which includes a matched filter coupled to receive the radar signals for filtering the radar signals to reduce the clutter components contained therein. The filter response of the matched filter is matched to the spectrum of the clutter components. The processor further includes a coherent integration filter coupled to receive the output of the matched filter for coherently integrating the matched filter output to further reduce the clutter components of the radar signal.

BRIEF DESCRIPTION OF THE DRAWINGS

A more complete appreciation of the Invention and many of the attendant advantages thereof will be readily obtained as the same becomes better understood by reference to the following detailed description when considered in connection with the accompanying drawings, wherein:

FIG. 1 is a plot of the normalized filter gain for 1 to 7 MTI cancellers as a function of the Doppler frequency normalized to the radar pulse repetition frequency;

FIG. 2 is a plot of the Improvement Factor for 1 to 7 MTI cancellers as a function of the clutter spectral width normalized to the radar pulse repetition frequency;

FIG. 3 is a plot of the loss given by Equation (2) as a function of the number of MTI cancellers in the system;

FIG. 6 is a schematic block diagram of a matched filter/FFT Doppler processor according to a preferred embodiment of the present Invention;

FIG. 7 is a schematic block diagram of the matched filter/Doppler processor 20 shown in FIG. 6;

DESCRIPTION OF THE PREFERRED EMBODIMENTS

Figure 4:
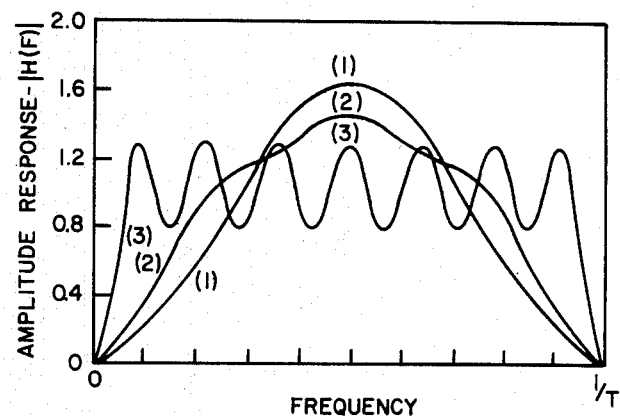
FIG. 4 is a plot of the amplitude responses versus frequency for three types of MTI delay line cancellers.
Figure 5A:
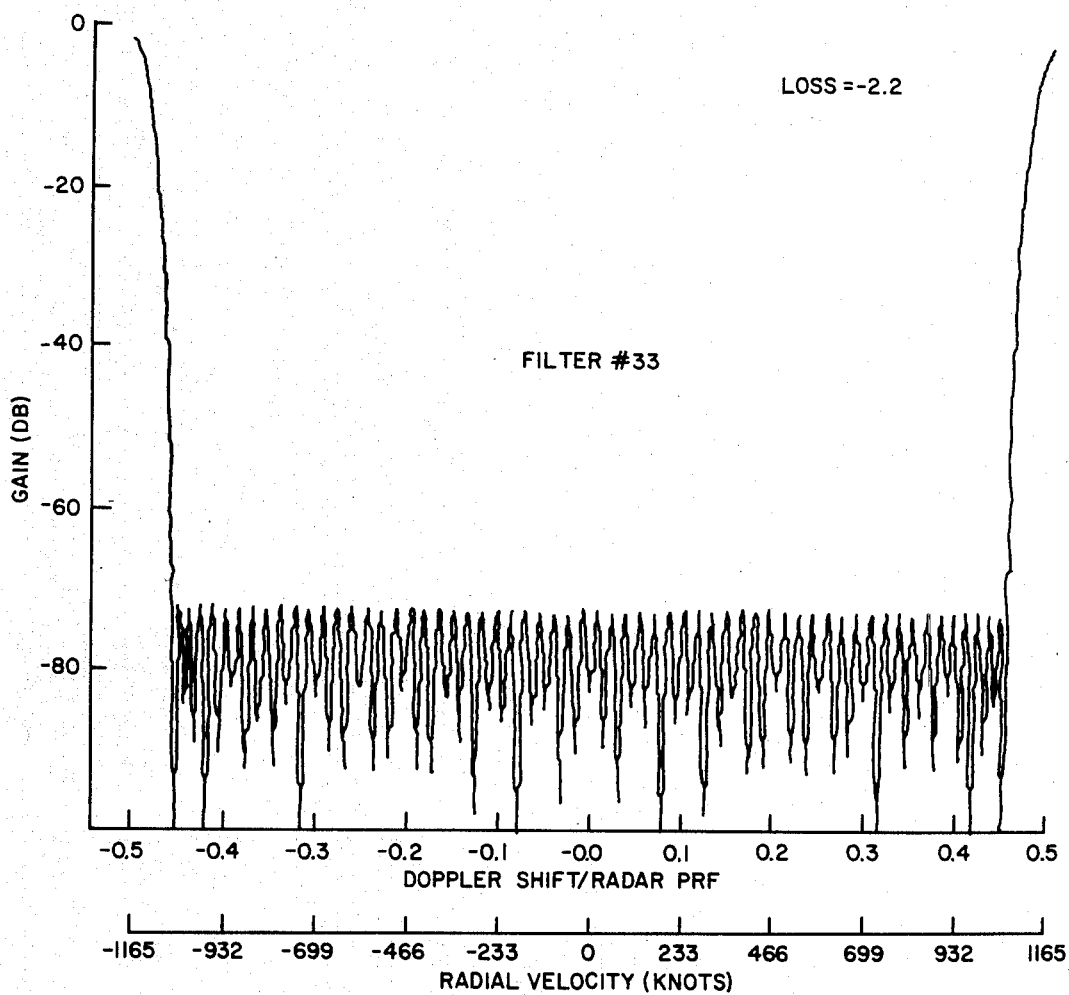
FIG. 5(a) is a plot of the amplitude response as a function of normalized Doppler shift for filter number 33 of a 64-pulse FFT Doppler processor with $-70$ dB Chebyshev weights.
Figure 5B:
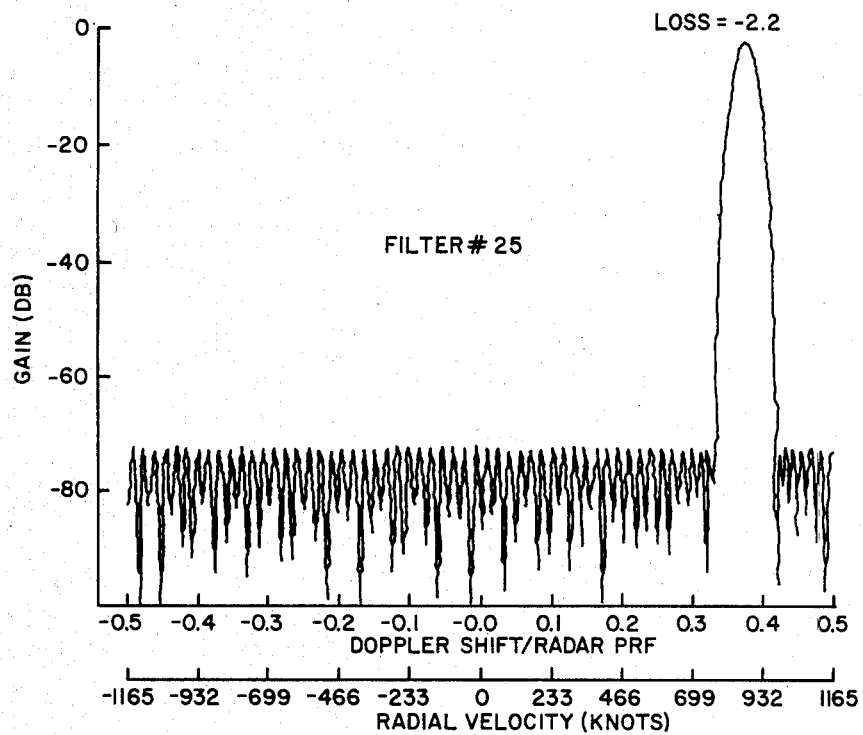
FIG. 5(b) is a plot of the amplitude response as a function of normalized Doppler shift for filter number 25 of a 64-pulse FFT Doppler processor with $-70$ dB Chebyshev weights.
Figure 5C:
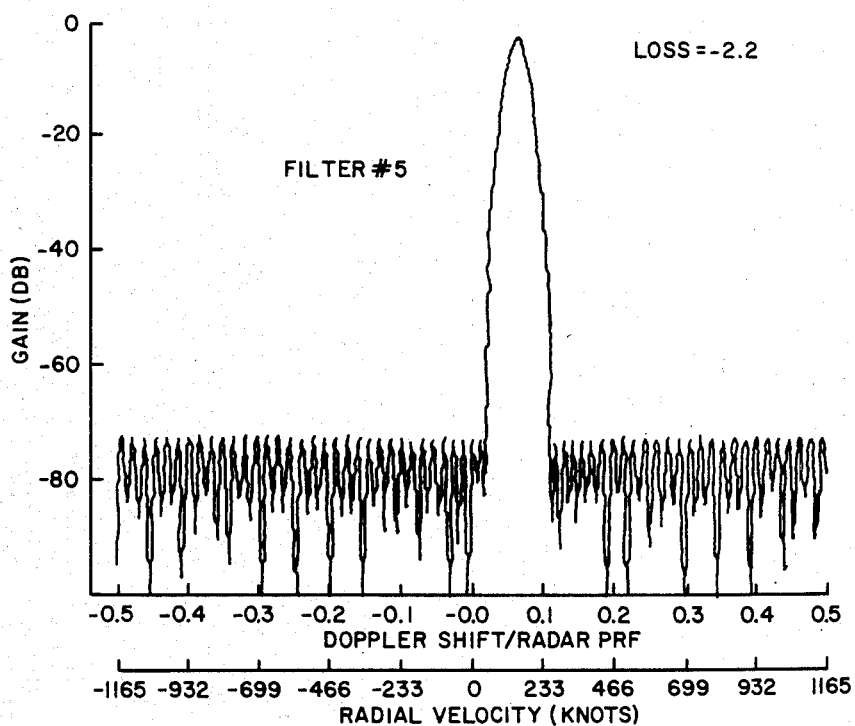
FIG. 5(c) is a plot of the amplitude response as a function of normalized Doppler shift for filter number 5 of a 64-pulse FFT Doppler processor with $-70$ dB Chebyshev weights.

Referring now to the drawings, wherein like reference numerals designate identical or corresponding parts throughout the several views, and more particularly to FIG. 6 thereof, a block diagram of a Doppler processor 10 according to a preferred embodiment of the present Invention is illustrated. The processor 10 is coupled to receive an intermediate frequency (IF) signal 12, including Doppler frequency information, from a radar receiver (not illustrated). The radar receiver may be of any well-known design and thus will not be described further herein. The IF signal 12 is coupled to a synchronous detector and analog to digital converter 14 which converts the IF signal to I (in-phase) and Q (quadrature) signals 16 and 18, respectively, in digital form in a manner well-known in the art.

The I and Q signals 16 and 18 are coupled to a matched filter Doppler processor 20 wherein the main antenna lobe clutter present in the I and Q signals is reduced to the level of side lobe clutter in the case of a radar on a moving platform or is reduced to the system noise level in the case of a stationary radar. The matched filter Doppler processor 20 comprises a plurality (N) of transversal filters, each of which operate on N pulses of each of the I and Q signals. Each of the N transversal filters covers a different portion of the Doppler frequency region of interest and each is matched to the input clutter spectrum. The matched filter Doppler processor 20 will be described in greater detail below.

The respective I and Q outputs, 22 and 24, of the matched filter Doppler Processor 20, each comprising N channels, are fed to an FFT processor 26 which includes N, $N_1$ point FFT circuits which each operate on $N_1$ pulses of each of the I and Q signals. The FFT processor 26 effectively implements a contiguous bank of coherent integration filters to further reduce the clutter plus noise residue in the signal.

The respective I and Q outputs, 28 and 30, of the FFT processor 26, each comprising $N \times N_1$ channels, are coupled to a magnitude calculator circuit 32 which squares and sums related I and Q pulses to develop an output data stream 34 representative of the intensity of the Doppler processed radar returns. The magnitude calculator 32 is a well known device and thus will not be described further herein. The output 34 may be coupled to further processors for display processing or otherwise as is well-known in the art.

FIG. 7 is a block diagram illustration of the matched filter Doppler processor 20 according to a preferred embodiment of the present invention. For clarity of illustration, in FIG. 7 all I and Q signals are shown as a common solid line. Therefore, it should be understood that each solid signal line actually represents two quadrature signals.

In the matched filter Doppler processor 20, the detected and digitized IF signals (I and Q) from the synchronous detector 14 are coupled to an expansion circuit 50 which includes m delay circuits $50_1$, $50_2$ through $50_m$ coupled in series to sequentially delay the detected IF signals. Each delay circuit delays the IF signals by a time T which equals the interpulse period. The delay circuits may take the form of m discrete delay elements, an m-stage shift register, or a delay line tapped at m equal delay intervals. Outputs from the expansion circuit 50 are taken from the input of the first delay circuit $50_1$, the output of the first delay circuit $50_1$, and the outputs of the remaining delay circuits $50_2$ through to produce signals X(0), X(1), and X(2) through X(m), respectively.

The delayed outputs X(0) through X(m) are coupled to N filters $52_1$ through $52_n$, of which only filters $52_1$ and $52_n$ are illustrated for reasons of clarity. Each of the filters are identical in construction. Therefore, only the first filter $52_1$ will be described in detail. The filter $52_1$ includes a plurality of mixer circuits $54_1$ through $54_m$ which are coupled, respectively, to receive the delayed signals X(o) through X(m). Additionally, the mixer circuits $54_1$ through $54_m$ are coupled to receive respective weighting signals $W_{11}$ through $W_{1m}$ supplied by a weight vector calculator 100, which will be described in detail below. The mixer circuits are multiplying devices which form the product of the delayed signal and the weighting signal input thereto. Each delayed signal X(0) through X(m), it should be remembered, is a complex signal containing I and Q quadrature components. Similarly, each weighting signal $W_{Nm}$ is a complex number. Thus, complex multiplier devices must be used to form the mixer circuits. Such complex devices are well-known in the art.

The outputs $X_1(0)$ through $X_1(m)$ of the mixer circuits are coupled to a coherent summer $56_1$ where they are combined in proper time sequence, as is well-known in the art, to produce a filtered signal $X_1$. In a similar manner the Nth filter $52_N$ multiplies the delayed signals X(0) through X(m) individually by the respective weighting signals $W_{N1}$ through $W_{Nm}$ and coherently sums the products thereof to produce a filtered sign $X_N$. The filtered signals $X_1$ through $X_N$ are coupled to the FFT processor 26 as shown in FIG. 6.

The optimum filter weight vector for a matched filter (i.e., when the signal is known completely so that the signal vector $\bar{S}$ can be defined) is:

$$W_{opt} = W_{Nm} = M_I^{-1} \bar{S}^* \quad (3)$$

where $M_I^{-1}$ is the inverse interference covariance matrix of the interference (clutter plus noise) and $\bar{S}^*$ represents the complex conjugate of the signal vector $\bar{S}$.

A generalized filter can be derived from a generalized likelihood ratio by assuming that the signal's Doppler shift is not precisely known but is known only within some interval (the bandpass of the filter). The entire Doppler region of interest is covered with a bank of filters, one for each interval.

For very small pulse widths compared to the interpulse period, the Doppler shift of the received signal is:

$$s(t) = \delta(t - kT)\exp(J2\pi f_d t) \quad (4)$$

where T is the time between transmitted pulses, $f_d$ is the Doppler frequency shift due to a moving target, and $$k \epsilon \{\text{integers}\}, \text{ and } \delta(t - kT) = \begin{cases} 0, t \neq kt \\ 1, t = kt \end{cases}$$

Assuming the Doppler shift $f_d$ has a uniform probability density function over an interval of length B centered at $f_i$, then the probability density function $P(f_d)$ is given by:

$$P(f_d) = \begin{cases} \frac{1}{B}, (f_i - B/2) \leq f_d < (f_i + B/2) \\ 0, \text{ elsewhere} \end{cases} \quad (5)$$

where $f_i$ is the center of the ith filter and is given by $f_i = (i-1)/NT$, $i = 1,2\ldots,N$ and $B = 1/NT$ (or the bandwidth of each filter) where N is the number of pulses integrated.

The expectation of the signal with respect to the unknown Doppler shift is:

$$\bar{s}(t) = E\{s/t\} = \delta(t - kT) \int_{-\infty}^{\infty} P(f_d)\exp(j2\pi f_d t)df_d \quad (6)$$

The above integral is the inverse Fourier transform of the probability density function of the Doppler shift which yields:

$$\bar{s}(t) = \delta(t - kT)\exp(j2\pi f_i t) \frac{\sin(\pi B t)}{\pi \beta t}. \quad (7)$$

All the parameters of Equation (7) are known except k. An N-pulse Doppler filter requires N samples of $\bar{s}(t)$. We must choose N sequential samples from the infinite set described by Equation (7). The filter response to $\bar{s}(t)$ is maximized if the samples selected are centered around the peak of the (sin x)/x curve of Equation (7).

The $l^{th}$ component of the signal vector for the $i^{th}$ filter is:

$$\bar{s}_{li} = \exp\left[\frac{j2\pi(i-1)}{N}\left(l - \frac{N+1}{2}\right)\right] \frac{\sin\left[\frac{\pi}{N}\left(l - \frac{N+1}{2}\right)\right]}{\frac{\pi}{N}\left(l - \frac{N+1}{2}\right)} \quad (8)$$

for $l = 1,2,\ldots,N$ and $i = 1,2\ldots,N$.

Since Equation (8) represents a completely known signal vector, it can be used in Equation (3) where the $l^{th}$ component of $\bar{S}^*$ is given by the complex conjugate of Equation (8). Therefore, weight vectors $W_{Nm}$ can be computed using Equation (3). The interference covariance matrix $M_I$ may be determined by first convolving the spectrum of the internal motion plus noise with the platform motion spectrum to yield the total spectrum. The probability density function $P_I(f)$ of the internal motion plus noise is given by:

$$P_I(f) = \left(\frac{1 - E_w}{\sigma_c \sqrt{2\pi}}\right) \exp\left[-\frac{(f - \mu_c)^2}{2\sigma_c^2}\right] + E_w T[\mu(f) - \mu(f - 1/T)] \quad (9)$$

where $\mu_c$ implies relative motion between the radar platform and the clutter, $\sigma_c$ (the standard deviation of the clutter spectrum) is a measure of the bandwidth of the clutter spectrum, T is the time between transmitted radar pulses, $E_w$ is the power of the white spectrum, $E_G$ is the power of the Gaussian spectrum, and $$\mu(f) = \begin{cases} 0, f < 0 \\ 1, f \geq 0 \end{cases} \quad (10)$$

Here it is assumed that the clutter has a Gaussian frequency spectrum, that the noise has a "white" frequency spectrum, and that the clutter and noise both have a Rayleigh amplitude probability density function normalized to unity such that $E_G + E_W = 1$.

Taking the Fourier transform of Equation (9), we obtain:

$$\psi(\tau) = (1 - E_w) \exp(-2\pi^2 \sigma_c^2 \tau^2 + j2\pi\mu_c\tau) + E_w \frac{\sin\left(\frac{\pi\tau}{T}\right)}{\left(\frac{\pi\tau}{T}\right)} \exp\left(\frac{j\pi\tau}{T}\right) \quad (11)$$

where $\tau$ is the delay.

The interference covariance matrix element $M_I(k,1)$ can then be taken from Equation (11) as follows:

$$M_I(k,l) = \quad (12)$$

$$(1 - E_w)\exp[-2\pi^2\sigma_c^2(k-l)^2 T^2 + j2\pi u_c(k-l)T] + E_w \frac{\sin\pi(k-l)}{\pi(k-l)} \exp[j\pi(k-l)]$$

where T is the time between samples, k and l are indices of the matrix, and $\tau = (k-l)T$.

The weight vector $W_{Nm}$ may be determined by substituting Equations (12) and (8) into Equation (3). The weight vector can be generated by means of a computer program which incorporates data on the antenna pattern gain of the radar system being utilized and which utilizes statistical models for the clutter and noise spectra, as should be apparent to those of skill in the art. The weight vector so generated could be permanently incorporated into the matched filter Doppler processor via either software or hardware. Such an implementation would, of course, entail accuracy limitations based on the accuracy of the statistical models utilized.

Figure 8:
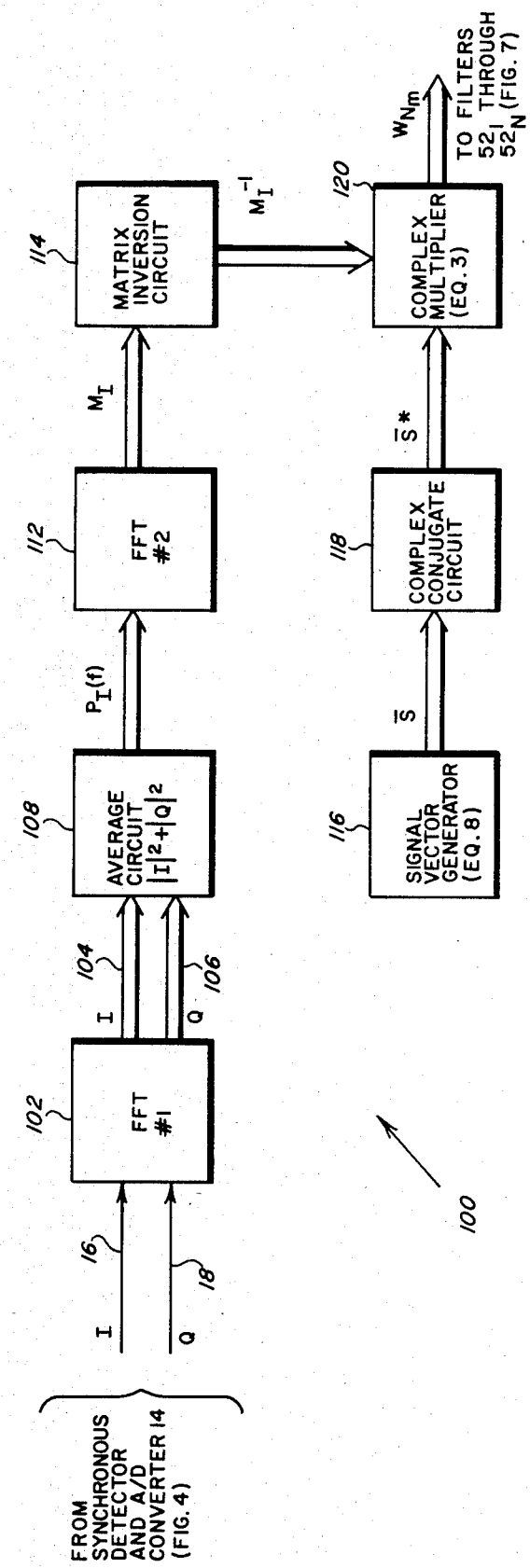
FIG. 8 is a schematic block diagram of the weight vector calculator 100 shown in FIG. 7.

FIG. 8 schematically illustrates a weight vector calculator 100 according to a preferred embodiment of the present Invention which adaptively calculates the weight vector $W_{Nm}$. The weight vector calculator 100 operates on current radar return data and thus eliminates the need for statistical models and other assumptions which may limit the system's accuracy.

The weight vector calculator 100 comprises an N point FFT 102 coupled to receive the detected and digitized IF signals (I and Q) from the synchronous detector 14 of FIG. 6 via lines 16 and 18. The FFT performs a spectral analysis on the radar returns data which includes the antenna pattern gain, the internal motion plus noise, and the platform motion. The N output pairs (I and Q) of the FFT 102 form data buses 104 and 106 which are coupled to an averaging circuit 108 where the absolute values of the spectral components of the I and Q quadrature signals are squared and summed to produced a power spectrum $P_I(f)$ similar to that given by Equation (9).

The power spectrum $P_I(f)$ is coupled to a second N point FFT circuit 112 which computes the Fourier transform of the power spectrum to produce the interference covariance matrix $M_I$ (similar to Equation 12). The matrix $M_I$ is then inverted by a matrix inversion circuit 114 to produce an inverted intereference covariance matrix $M_I^{-1}$.

The signal vector $\bar{S}$ defined by Equation (8) is generated in a signal vector generator 116. The signal vector $\bar{S}$ is coupled to a conjugator circuit 118 when the complex conjugate $\bar{S}^*$ is formed. The signal vector $\bar{S}$ may be directly implemented from Equation (8) by the generator 116. Alternatively, the signal vector $\bar{S}$ and its complex conjugate $\bar{S}^*$ could be pre-calculated external to system of FIG. 8 with the conjugate signal vector $\bar{S}^*$ stored in some form of memory replacing the generator 116 and the conjugator 118, as should be apparent to those of skill in the art.

The inverted interference covariance matrix $M_I^{-1}$ and the conjugated signal vector $\bar{S}^*$ are multiplied together as per Equation (3) in a complex multiplier circuit 120 to produce the weight vector $W_{Nm}$ which is supplied to the filters $52_1$ through $52_N$ shown in FIG. 7.

The FFT circuits 102 and 112, the averaging circuit 108, the matrix inversion circuit 114, the complex conjugate circuit 118, and the complex multiplier 120 are all well-known in the art and thus will not be described further herein. The implementation of Equation (8) in the generator 116 is believed to be fully within the ability of those skilled in the art.

Figure 9:
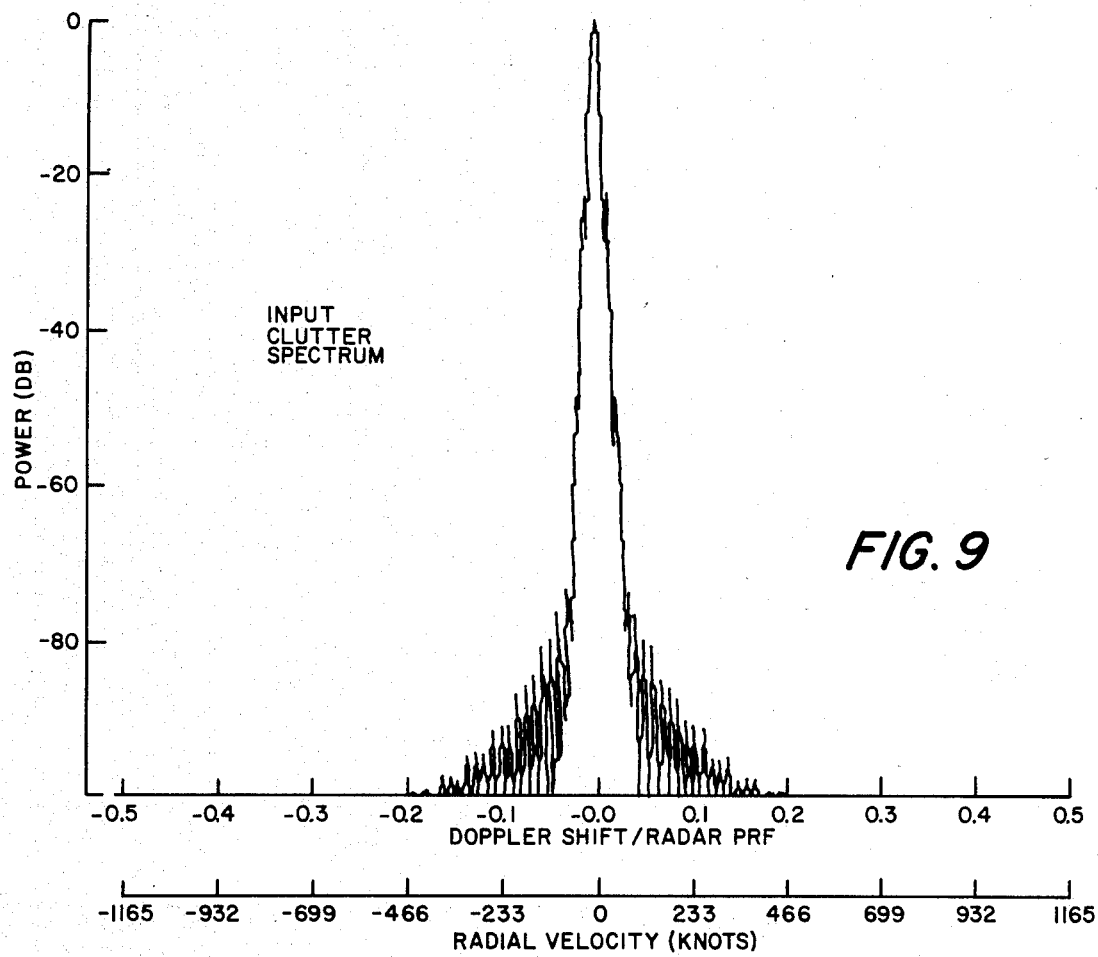
FIG. 9 is a plot of a typical input clutter spectrum generated by a radar system located on a moving platform.
Figure 10A:
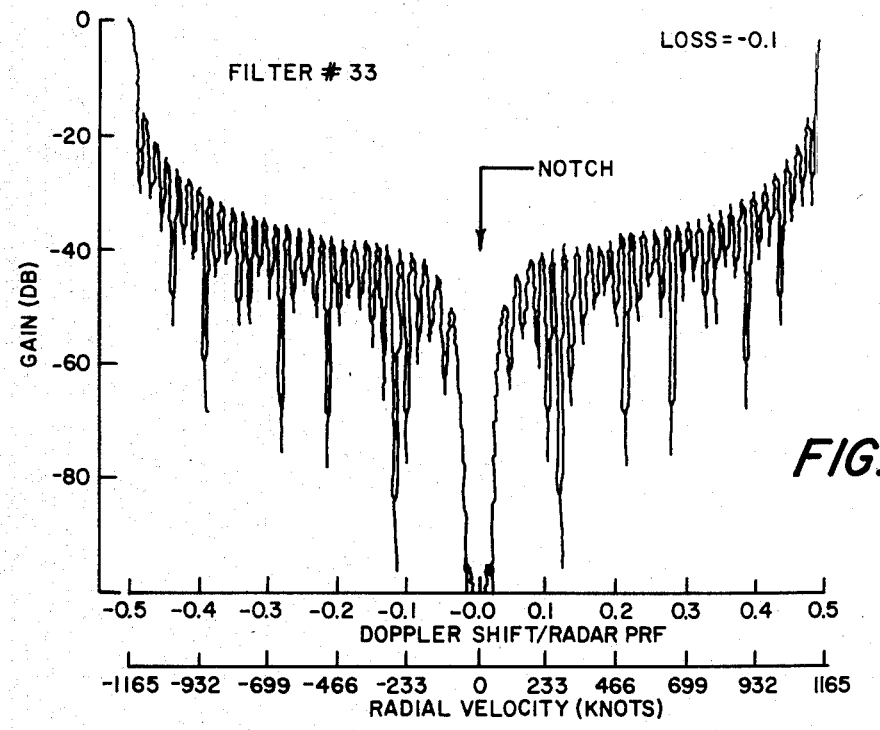
FIG. 10(a) is a plot of the amplitude response for filter number 33 of a 64-pulse matched filter Doppler processor of the present Invention as shown in FIG. 6 matched to the input clutter spectrum of FIG. 9.
Figure 10B:
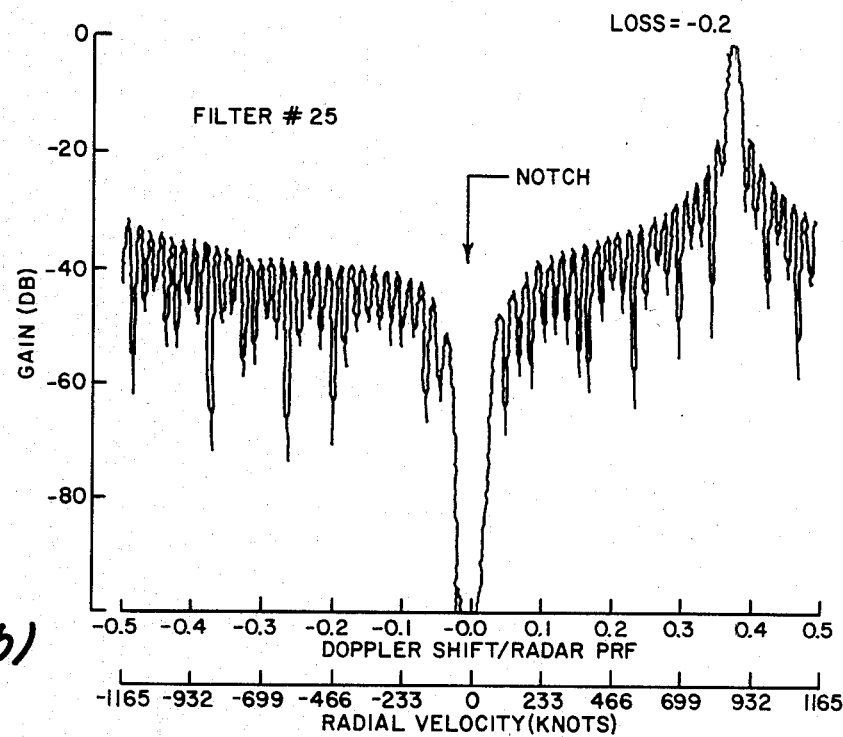
FIG. 10(b) is a plot of the amplitude response for filter number 25 of a 64-pulse matched filter Doppler processor of the present Invention as shown in FIG. 6 matched to the input clutter spectrum of FIG. 9.
Figure 10C:
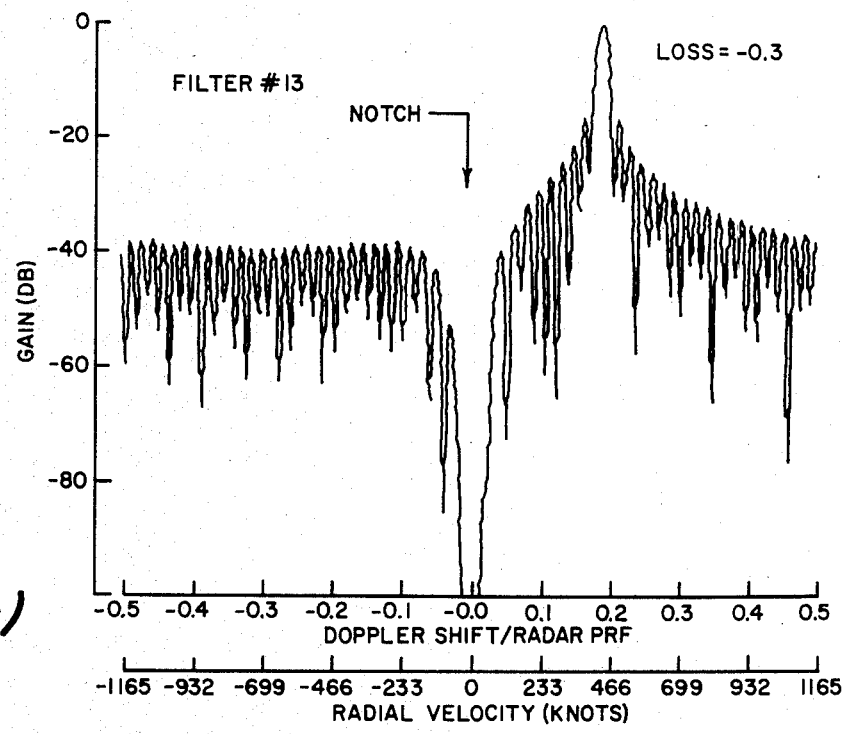
FIG. 10(c) is a plot of the amplitude response for filter number 13 of a 64-pulse matched filter Doppler processor of the present Invention as shown in FIG. 6 matched to the input clutter spectrum of FIG. 9.
Figure 10D:
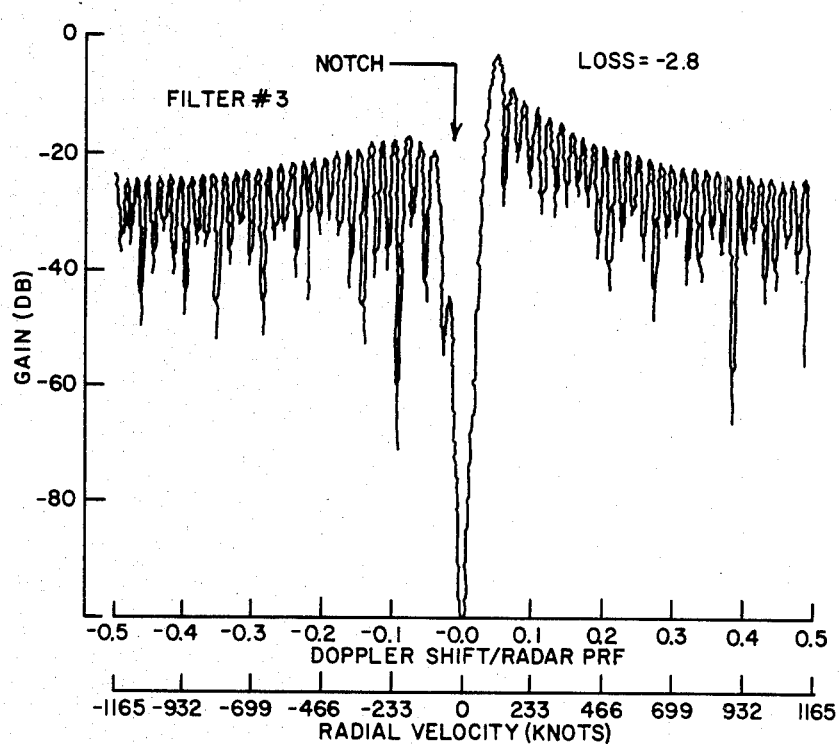
FIG. 10(d) is a plot of the amplitude response for filter number 3 of a 64-pulse matched filter Doppler processor of the present Invention as shown in FIG. 6 matched to the input clutter spectrum of FIG. 9.

The matched filter Doppler processor 20 shown in FIGS. 6 and 8 is matched to the expected value of the unknown signal vector. Thus, since the filter is matched to the expected value rather than to the known value it is not a "Matched filter" within the strict meaning of that phrase. Effectively, the matched filters are matched to the input clutter spectrum. For example, FIG. 9 illustrates a typical input clutter spectrum generated by a radar system located on a moving platform. The clutter spectrum was measured by an antenna pointed at an angle of 90° with respect to the platform velocity vector. The radar transmitter was generating in the S-band with a pulse repetition frequency of 50 kHz.

The matched filter Doppler processor 20 of the present Invention uses its degrees of freedom to lower the filter response in the vicinity of the clutter but not elsewhere. This is clearly illustrated in FIGS. 10(a), 10(b), 10(c), and 10(d) which respectively depict the responses for filters 33, 25, 5, and 3 of a 64-pulse matched filter/FFT Doppler processor (N=64, $N_1$=16) as shown in FIG. 6 matched to the input clutter spectrum of FIG. 9. The most significant feature of each filter's response is a notch centered around zero Doppler which is approximately the reciprocal of the input clutter spectrum shown in FIG. 9.

Since the performance of coherent integrators, such as the FFT processor 26 of FIG. 6, in colored noise or clutter is irregular and unpredictable, the system of the present Invention prewhitened this clutter input to the FFT processor 26 by preceding it with the matched filter Doppler processor 20. The prewhitened clutter input is then coherently integrated in the FFT processor 26 whose performance against white noise is well established. This allows the combined cascaded filters 20 and 26 to function as a matched filter which is matched to a much larger pulse train and in non-white interference.

In the radar processor of the present Invention all of the filters are designed to maximize the improvement factor. Therefore, the filters close to the main lobe clutter are optimized to detect low velocity targets. This allows excellent clutter rejection and low minimum detectable velocities (MDV) with minimal loss.

Figure 11:
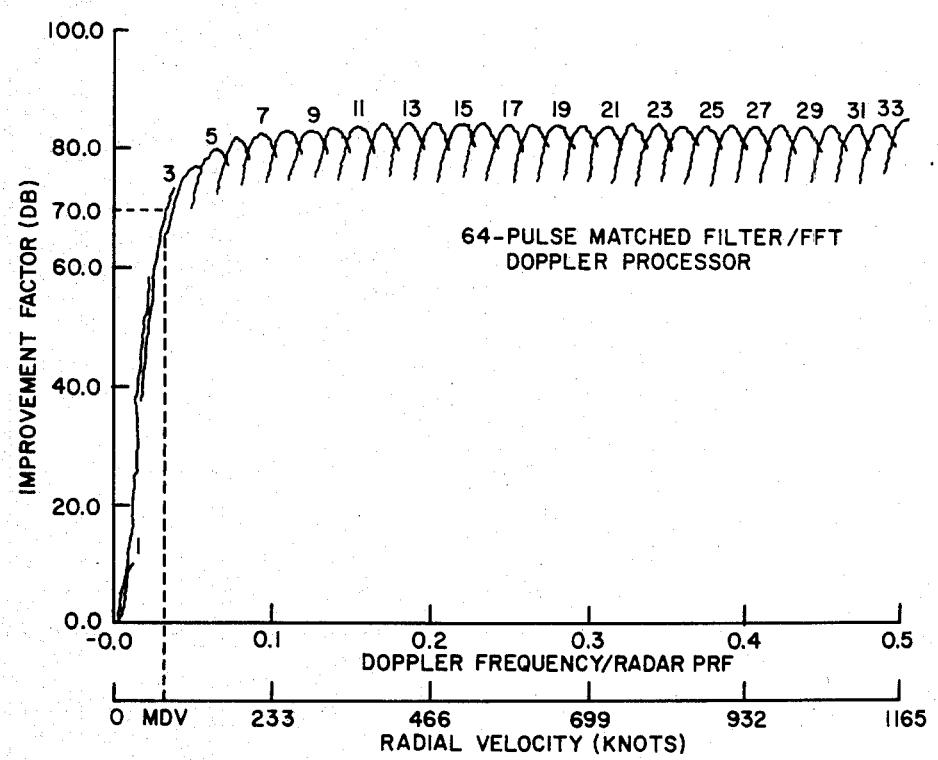
FIG. 11 is a plot of the Improvement Factor for a 64-pulse matched filter/FFT Doppler processor according to the present Invention as shown in FIG. 6 matched to the input clutter spectrum of FIG. 9.

Table I shows the approximate results of three types of 64 pulse processors analyzed using the clutter spectrum of FIG. 9 and a clutter-to-noise ratio of 65 dB. In comparing these processors, an improvement factor of 70 dB is assumed to be required to detect the desired target. The MDV is determined by the velocity at which the improvement factor of 70 dB is achieved for each of the three processors. FIG. 11 is a plot of the improvement factor for a 64-pulse matched filter/FFT Doppler processor of the present Invention matched to the input clutter spectrum of FIG. 9. As shown in FIG. 9. the processor produces an MDV of 80 knots for an improvement factor of 70 dB.

TABLE I

| Type of Processor | Processor Results | | |
|---|---|---|---|
| | MDV (Knots) | Loss (dB) | Improvement Factor (dB) |
| 1. FFT | 120 | 2.2 | 75 |
| 2. MTI(2)-FFT | 170 | 0.1 | 80 |
| 3. MATCHED FILTER | 80 | 0.1 | 85 |

The loss in signal to noise ratio is reduced from 2.2 dB for the weighted FFT to about 0.1 dB for the matched filter processor of the present Invention. To detect a given sized target, the lower loss will result in a requirement for about 40% less transmitter power which will allow about a 40% reduction in transmitter and power supply weight and will also mean a reduction in the prime power requirements. These are the heaviest subsystems of a radar system and therefore this technique will have a major impact on the total radar system weight which is of primary importance for radars designed for aircraft and other moving platforms.

The MDV achieved by the matched filter processor of the present Invention is 80 knots as compared to 120 knots and 170 knots for the other two processors. This significantly reduces the capability of a target to penetrate a surveillance region by flying a course which is nearly tangential to the radar platform. Since the blind velocity regions are also reduced by the same amount, the matched filter processor also reduces the capability of a target to penetrate by flying near a blind velocity.

The improvement factor achieved by the matched filter processor of the present Invention is 85 dB as compared to 75 dB and 80 dB for the other processors. This allows a required improvement factor to be achieved by processing fewer pulses. Therefore with a shorter coherent processing interval, the transmitter frequency or the radar PRF can be changed more often for electronic counter-countermeasures (ECCM) purposes or to reduce the effects of blind velocities.

The matched filter performance data presented in Table I and discussed above is for a matched filter processor standing alone, e.g., taken at the output of the matched filter Doppler processor 20 of FIG. 6. Further processing in the cascaded FFT processor 26 would have the effect of increasing the coherent processing interval and would thus greatly increase the radar sensitivity as measured by the improvement factor.

The factored matched filter/FFT processor of the present Invention is significantly superior to current radar Doppler processors when compared by all three of the figures of merit used to measure the performance of radar Doppler processors (i.e., improvement factor, loss, and minimum detectable velocity).

Figure 12:
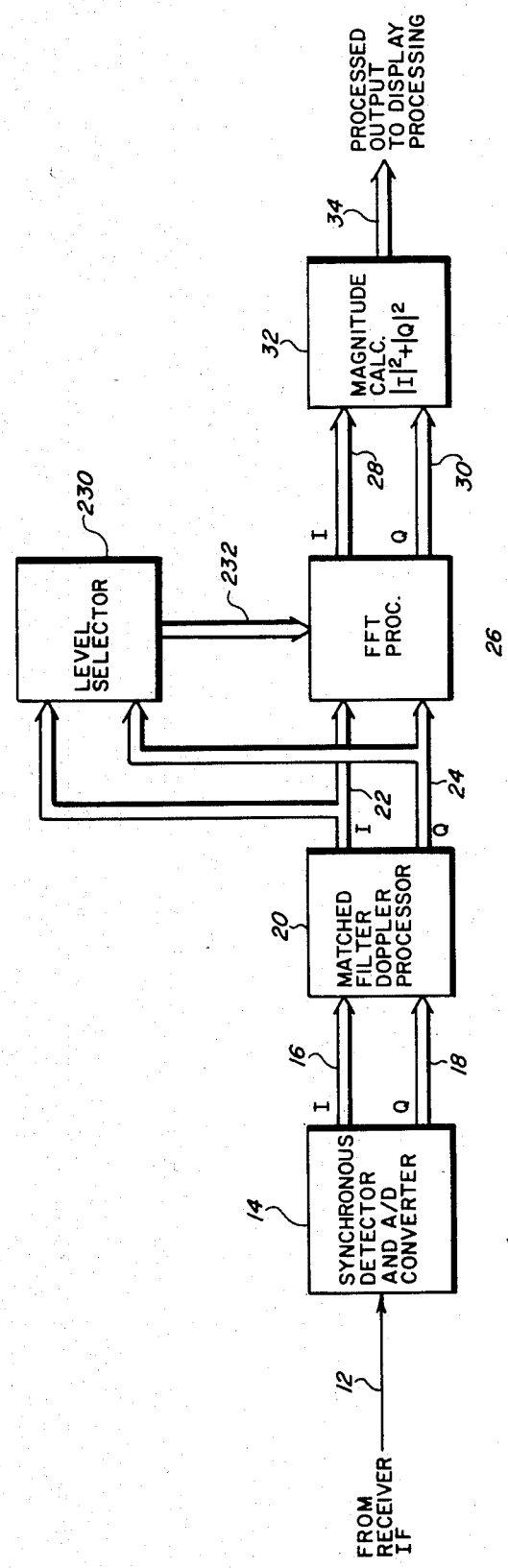
FIG. 12 is a schematic block diagram of a matched filter/FFT Doppler processor according to another preferred embodiment of the present Invention.

FIG. 12 illustrates a matched filter/FFT Doppler processor 200 according to another preferred embodiment of the present Invention. In FIG. 12 the synchronous detector and A/D converter 14, the matched filter Doppler processor 20, the magnitude calculator 32, and the FFT processor 26 are identical to the like numbered elements shown in FIG. 6 and described in detail above. Here the N outputs of the matched filter Doppler processor 20 appearing on buses 22 and 24 are coupled to both the FFT processing circuit 26 and to a level selector 230. The level detector 230 is a digital comparator which compares the N outputs to a predetermined number or threshold level so as to determine which of the N outputs have a high probability of containing a target. Such digital comparator circuits are well-known in the art and thus will not be described further herein.

The level selector 230 selects $N_A$ of the N outputs which are likely to contain a target. The addressses of the $N_A$ selected outputs are communicated to the FFT processor 26 via a control line 232. The signals on the control line 232 enable $N_A$ of the N FFT circuits in the FFT processor 26 such that only the $N_A$ selected outputs of the matched filter Doppler processor 20 are further processed. Thus, the processor 200 of FIG. 12 adaptively selects certain high probability matched filter output signals for processing by the FFT processor. This has the effect of reducing the number of required operations and thus reduces the throughput rate of the processor. The performance characteristics of the processor are essentially unchanged from those described above with respect to the embodiment of FIG. 6.

Additional information regarding the present Invention is presented in G. A. Andrews and S. L. Sheller, "A Matched Filter Doppler Processor for Airborne Radar", NRL Report 8700, July 13, 1983, Naval Research Laboratory, Washington, D.C. The contents of this publication are incorporated herein by reference.

Obviously, numerous (additional) modifications and variations of the present Invention are possible in light of the above teachings. It is therefore to be understood that within the scope of the appended claims, the Invention may be practiced otherwise than as specifically described herein.

What is claimed as new and desired to be secured by Letters Patent of the United States is:

1. A Doppler processor device for processing radar signals to remove clutter contained therein, comprising:
N transversal filters coupled to receive said radar signals for filtering said radar signals to reduce the clutter components therein, each of said N transversal filters covering a different portion of the Doppler frequency spectrum of interest, each of said N transversal filters having a filter response matched to the spectrum of said clutter, each of said N transversal filters includes first fast Fourier transform means coupled to receive said radar signals for analyzing the spectrum of said radar signals to produce a power spectrum therefrom, second fast Fourier transform means coupled to receive the output of said first fast Fourier transform means for producing an intereference covariance matrix therefrom, matrix inversion means coupled to receive the output of said second fast Fourier transform means for producing an inverted intereference covariance matrix, signal vector generator means for generating a signal vector, complex conjugate circuit means for producing a complex conjugate of said signal vector; multiplier means coupled to receive said inverted interference covariance matrix and said complex conjugate of said signal vector for producing the product thereof as said weighting vector, weighting means coupled to receive said weight vector and said plurality of time-delayed radar signals for weighting said time-delayed radar signals in response to said weight vector to produce a plurality of weighted radar signals, and coherent summation means coupled to receive said plurality of weighted radar signals for combining said weighted radar signals in time coherency;

signal expansion means coupled to receive said radar signals and including at least one delay stage for separating said radar signals into a plurality of time-delayed radar signals; and coherent integration filter means coupled to receive the output of said transversal filters for coherently integrating said output to further reduce clutter and noise components contained therein.

2. The Doppler processor device as recited in claim 1, wherein said signal vector generator means generates said signal vector ($\bar{S}_{li}$) as given by:

$$\bar{s}_{li} = \exp\left[j\frac{2\pi(i-1)}{N}\left(l - \frac{N+1}{2}\right)\right] \frac{\sin\left[\frac{\pi}{N}\left(l - \frac{N+1}{2}\right)\right]}{\frac{\pi}{N}\left(l - \frac{N+1}{2}\right)}$$

where:
l+1, 2, ..., N
i=1, 2, ..., N.

3. A Doppler processor device for processing radar signals to remove clutter contained therein, comprising:

matched filter means coupled to receive said radar signals for filtering said radar signals to reduce the clutter components therein, said matched filter means including N transversal filters coupled to receive said radar signals, each of said N transversal filters covering a different portion of the Doppler frequency spectrum of interest, each of said N transversal filters having a filter response matched to the spectrum of said clutter, each of said N transversal filters including first fast Fourier transform means coupled to receive said radar signals for analyzing the spectrum of said radar signals to produce a power spectrum therefrom, second fast Fourier transform means coupled to receive the output of said first fast Fourier transform means for producing an intereference covariance matrix therefrom, matrix inversion means coupled to receive the output of said second fast Fourier transform means for producing an inverted intereference covariance matrix, signal vector generator means for generating a signal vector complex conjugate circuit means for producing a complex conjugate of said signal vector; multiplier means coupled to receive said inverted interference covariance matrix and said complex conjugate of said signal vector for producing the product thereof as said weighting vector, weighting means coupled to receive said weight vector and said plurality of time-delayed radar signals for weighting said time-delayed radar signals in response to said weight vector to produce a plurality of weighted radar signals; and coherent summation means coupled to receive said plurality of weighted radar signals for combining said weighted radar signals in time-coherency;

signal expansion means coupled to receive said radar signals and including at least one delay stage for separating said radar signals into a plurality of time-delayed radar signals; and coherent integration filter means coupled to receive the output signals of said N transversal filters for coherently integrating said output signals to reduce clutter and noise components contained therein.

4. The Doppler processor device as recited in claim 3, wherein said signal vector generator means generates said signal vector ($\bar{S}_{li}$) as given by:

$$\bar{s}_{li} = \exp\left[j\frac{2\pi(i-1)}{N}\left(l - \frac{N+1}{2}\right)\right] \frac{\sin\left[\frac{\pi}{N}\left(l - \frac{N+1}{2}\right)\right]}{\frac{\pi}{N}\left(l - \frac{N+1}{2}\right)}$$

where
l=1,2, ..., N
i=1,2, ..., N.

* * * * *